Nov. 13, 1945.    J. P. SEAHOLM    2,388,874
CASTER WHEEL MECHANISM
Filed July 19, 1944
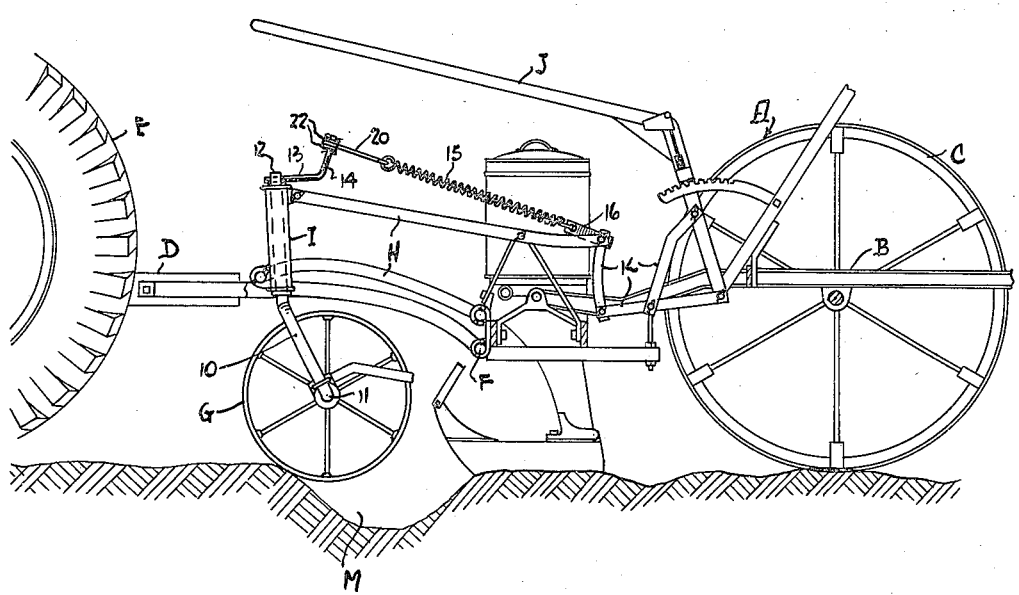
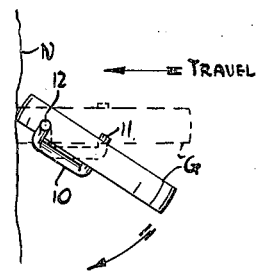
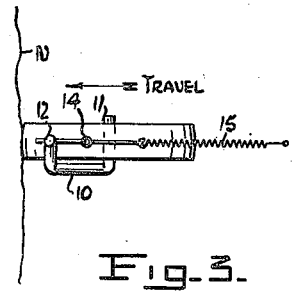
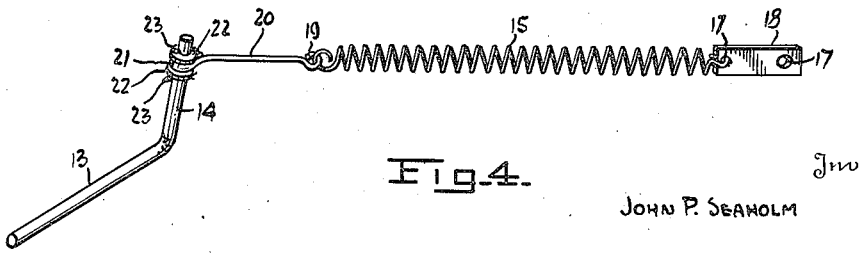
Inventor
JOHN P. SEAHOLM
By Carlsen & Hazle
Attorneys Patented Nov. 13, 1945

2,388,874

UNITED STATES PATENT OFFICE 2,388,874

CASTER WHEEL MECHANISM

John P. Seaholm, Moline, Ill., assignor to Minneapolis-Moline Power Implement Company, Minneapolis, Minn., a corporation of Delaware Application July 19, 1944, Serial No. 545,725

2 Claims. (Cl. 97—127)

This invention relates to improvements in the caster wheel mechanisms used in connection with planters and similar implements.

It has been found that the ordinary caster wheel, since it is mounted on the implement in such manner that it may drop into depressions in the ground as the implement travels across such depressions, has a tendency to turn to one side or another of its own weight to such position that it will not ride up over the side of the depression as the implement travels forwardly. Thus, for example in planting a gullied field, the caster wheel may actually swing broadside to the gullies so that it will not roll upwardly out of the same but will actually drag its way clear, causing considerable strain on its mountings, as well as interfering with the proper operation of the planter. It will, of course, be understood that the wheel in order to properly caster must have its caster axis disposed in a more or less upright plane forwardly of its axis of rotation, and as a result, when the wheel becomes freely suspended as it may when it runs over a gulley, the center of gravity being much to the rear of the caster axis will cause the wheel to swing to one side or another with respect to the line of travel. Depending on the distance of the caster axis forwardly of the axis of rotation of the wheel, the wheel will assume an angle such that its contact with the far side of the gulley as it meets the same during forward travel may cause it to swing exactly broadside thereto.

Bearing in mind these facts, it is the primary object of my invention to provide means for yieldably holding the caster wheel in its normal position aligned with the direction of travel even while the wheel is freely suspended, and in such manner that the normal castering action of the wheel while in contact with the ground will not be hindered. Another and important object of my invention is to provide means of this character and for this purpose which may be readily applied to caster wheels in present use on various kinds of implements, and without requiring any major alteration of the structure.

These and other more detailed and specific objects will be disclosed in the course of the following specification, reference being had to the accompanying drawing, in which—

Fig. 1 is a longitudinal vertical sectional view through a conventional form of corn planter as connected for draft purposes to a tractor, and illustrating the application of my improved caster wheel mechanism thereto.

Fig. 2 is a diagrammatical view illustrating in plan the action of a caster wheel as it becomes freely suspended in the gulley over which the implement is traveling, and illustrating the manner in which the wheel may swing toward and broadside against the edge of the gulley.

Fig. 3 is a similar view, but illustrating the manner in which the application of my invention to the wheel will hold it in alignment with the direction of travel.

Fig. 4 is an enlarged perspective view of the essential elements of my attachment for the caster wheel of Fig. 1.

Referring now more particularly and by reference characters to the drawing, I have shown therein a corn planter designated at A which is essentially identical to that disclosed in the United States Patent No. 2,226,572 of Charles E. Nelson and Easborn Rusco issued December 31, 1940, to which attention is invited for details of the implement caster wheel combination, per se. So far as pertinent to my invention it will be apparent that the planter A has a frame B supported rearwardly by ground wheels C and forwardly supported by a draft tongue D connected by the usual hitch (not shown) to a tractor E, and pivotally connected at its rear end F to a forward part of the frame. The planter frame is then raised and lowered to regulate the planting depth by means of a caster wheel G connected to the forward ends of parallel links H by means of an upright bearing sleeve I. A hand lever J is arranged to raise and lower the rear end of the uppermost link H by means of links K to thus position the caster wheel vertically with respect to the frame.

In accordance with conventional practice, the caster wheel G has an axle 10 provided at a lower end with a pintle 11 upon which the wheel is journaled and from which the axle extends in a generally forward and upward angle toward its upper end 12 which is journaled in the aforesaid bearing I. Thus the caster wheel G may rotate freely in a horizontal axis about the pintle 11 responsive to travel movements of the implement while, due to the trailing relation of this axis with respect to the generally upright axis about which its end 12 is journaled in the bearing I, the wheel may caster toward either side in accordance with changes of direction of travel.

As seen in Fig. 1, if the machine is operated over a field having one or more gulleys or depressions M extending transversely to the direction of travel, the caster wheel G as it traverses the gulleys will for a short period of time be supported out of contact with the ground surface.

It being apparent that the center of gravity of the caster wheel is rearward of the caster axis of the axle end 12, there will be a tendency for the wheel while thus supported to swing to one side or the other from its normal position parallel with the direction of travel. This condition is illustrated in Fig. 2, wherein it will be apparent that if the axle end 12 is located at about the conventionally indicated position forwardly of the axis of rotation of the wheel, then the wheel may swing to the position indicated where it is so angled with respect to the far side of the depression, indicated at N, that continuation of the forward travel from that point will result in the wheel swinging in the direction of the arrow to a position broadside with respect to the gulley side M. Thus the wheel cannot travel out of the gulley but can only drag itself clear, with a resulting great strain upon its mounting and the entire caster wheel structure. It may be that the location of the caster axis further forward from the point herein indicated, may counteract this tendency to some extent, but for purposes of compactness an axle of this shape is impracticable in the case of most implements. What is obviously needed, therefore, is some means for yieldably holding the caster wheel in its normal position parallel with the direction of travel and which means will become effective when the caster wheel for any reason moves out of contact with the ground surface, to maintain the wheel in such proper position.

In accordance with my invention I provide means for this purpose which comprises an arm 13 rigidly secured to the upper extremity of the caster wheel axle end 12 and extending rearward and radially therefrom for some distance. The rear end of the arm 13 is then turned upwardly, as indicated at 14, forming a finger which is eccentric to the caster axis of the wheel. I then provide a comparatively soft retractile coil spring which, generally speaking, is stretched from the finger 14 to some point on the implement along a line parallel with the direction of travel of the implement, or rearward of the caster wheel, so as to exert a continuous light rearward pull upon the finger 14. This spring tension will then resist any tendency toward lateral swinging movements of the finger 14 such as would occur due to rotation of the caster wheel axle 10 about its caster axis, and it is found in practice that relatively light tension is sufficient, as indicated in Fig. 3, to completely counteract the tendency of the wheel to swing toward either side from normal position while it crosses gulleys or similar depressions.

In the case of the implement here illustrated the rear end of the spring 15 is connected by a plate 16 to the rear end of the uppermost caster positioning link H and the plate 16 is provided with apertures 17 at each end for making this connection, as clearly shown. The forward end of the spring 15 is then connected in an eye 19 formed at the rear end of the link 20. The forward end of this link is provided with another eye 21 by which it is journaled freely on the upthrust finger 14 of the arm 13. Collars or washers 22 are positioned above and below the eye 21 and held in position by cotter keys 23 so that the eye has complete freedom for rotation about the finger 14. It will be clearly evident that if a spring of proper light tension is employed the caster wheel G may then caster freely while in contact with the ground and may caster about a full circle if required in the operation of the instrument, due to the fact that the finger 14 turns upwardly and supports the link 20 well above the end of the axle so that the spring will clear during such action.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. The combination with the caster wheel of an implement having an axle rotatably supported by an upper end portion to provide for full three hundred sixty degree castering action of the wheel, an arm secured to and radially extending from said upper end portion of the axle, and a coil spring connected at one end to the free end of said arm and stretched to a point on the frame of the implement spaced therefrom along a line parallel with the direction of travel of the implement, said arm and spring being operative to permit such full castering action of the wheel and to restore the wheel to normal position from any castered position.

2. The combination with the caster wheel of an implement having an axle shank rotatably supported by an upper end portion to provide for castering action of the wheel, an arm secured to and radially extending from said upper end portion of the axle shank, a finger on said arm, a retractile coil spring stretched between the finger and a point on the implement spaced from the axle, said finger being turned upwardly from the arm, and the spring being connected to the finger at a level above the end of the axle to provide clearance of the spring above the said axle when the arm is swung backward.

JOHN P. SEAHOLM.